United States Patent
Nishi

(10) Patent No.: US 7,673,162 B2
(45) Date of Patent: Mar. 2, 2010

(54) INFORMATION PROCESSING TERMINAL WITH WAKE ON LAN AND POWER CONTROL METHOD THEREOF

(75) Inventor: Youhei Nishi, Kanagawa (JP)

(73) Assignee: NEC Infrontia Corporation, Kanagawa (JP)

(*) Notice: Subject to any disclaimer, the term of this patent is extended or adjusted under 35 U.S.C. 154(b) by 629 days.

(21) Appl. No.: 11/582,968

(22) Filed: Oct. 19, 2006

(65) Prior Publication Data

US 2007/0094526 A1  Apr. 26, 2007

(30) Foreign Application Priority Data

Oct. 20, 2005  (JP) .............................. 2005-305802

(51) Int. Cl.
*G06F 1/26* (2006.01)

(52) U.S. Cl. ...................... 713/323; 713/310; 713/324; 455/574

(58) Field of Classification Search ................ 713/323, 713/324, 310; 370/318; 455/574
See application file for complete search history.

(56) References Cited

U.S. PATENT DOCUMENTS

| | | | | |
|---|---|---|---|---|
| 5,860,001 A | * | 1/1999 | Cromer et al. ................. | 713/1 |
| 7,366,888 B2 | * | 4/2008 | Dayan et al. .................... | 713/2 |
| 7,389,431 B2 | * | 6/2008 | Ohara ......................... | 713/310 |
| 2006/0154664 A1 | * | 7/2006 | Hidaka ........................ | 455/436 |

FOREIGN PATENT DOCUMENTS

| | | |
|---|---|---|
| JP | 6-22060 A | 1/1994 |
| JP | 2000-99414 A | 4/2000 |
| JP | 2000-284864 A | 10/2000 |
| JP | 2002073311 | 3/2002 |
| JP | 2002-341979 A | 11/2002 |
| JP | 2003-29773 A | 1/2003 |
| JP | 2004145637 | 5/2004 |
| JP | 2004-274602 A | 9/2004 |

OTHER PUBLICATIONS

JP 06-022060—English translation.*

* cited by examiner

*Primary Examiner*—Thuan N Du
(74) *Attorney, Agent, or Firm*—Sughrue Mion, PLLC

(57) ABSTRACT

An information processing terminal includes a WOL monitoring unit for monitoring whether or not a particular packet for indicating resumption of operation from a suspended state is received, a resume processing unit for resuming the operation from the suspended state, a factor monitoring unit for recording a factor of the resumption to a memory, a cancel monitoring unit for monitoring whether or not a cancel signal to a communication request received after the resumption is received, and a suspend processing unit for switching the operation to the suspended state when the factor of the resumption is reception of the particular packet as well as the cancel signal is received after the resumption. With this arrangement, power consumption of the information processing terminal can be suppressed.

8 Claims, 6 Drawing Sheets

INFORMATION PROCESSING TERMINAL WITH WAKE ON LAN AND POWER CONTROL METHOD THEREOF

BACKGROUND OF THE INVENTION

1. Field of the Invention

The present invention relates to an information processing terminal connected to LAN for carrying out IP communication, and, more particularly, to power control of a terminal including a function for coping with WOL (Wake On LAN).

2. Description of the Related Art

As information processing terminals such mobile terminals are provided with multifunction, how to suppress their power consumption becomes a problem. As a technology for suppressing power consumption of a terminal, there is known a technology for shifting the terminal in an operating state to a suspended state. The term "suspended" means operation for reducing power supplied to the terminal after a working state until just before the suspend state occurs is stored in a memory.

The terminal can be automatically shifted from the operating state to the suspended state by using, for example, timer processing. A flowchart of FIG. 7 shows an example of the timer processing.

In FIG. 7, when an information processing terminal in a suspended state is resumed by being actuated by a user (step C1), a suspend timer, to which a predetermined period of time is set, starts (step C2). After the timer starts, the terminal monitors a flag showing whether or not interrupt processing occurs (step C3), and the suspend timer is reset each time the interrupt processing occurs (step C4).

The information processing terminal monitors a state of the timer in parallel with monitoring of the interrupt flag (step C5), and when the time expires, that is, when the predetermined period of time has passed without occurrence of the interrupt processing after the terminal is resumed, the terminal shifts to the suspended state (step C6). A power control method making use of the timer processing is disclosed in, for example, Japanese Patent Application Laid-Open No. 2002-341979.

Further, there is conventionally known a WOL technology for resuming an information processing terminal in a suspended state from a remote place through LAN. When a terminal for coping with the WOL receives a packet, in which a particular bit train is described, from LAN, it is resumed from a suspended state. A technology as to computer processing using WOL is disclosed in Japanese Patent Application Laid-Open No. 2000-099414.

However, the information processing terminal for carrying out the suspend timer described above keeps an operating state for a predetermined period of time even if no interrupt processing occurs after it is resumed from a distant place by WOL. This means that if even there is no user who carries out response manipulation to the terminal resumed by WOL, the terminal continuously consumes power more than the suspended state until the period of time expires. This operation is not desirable from a view point of power saving.

SUMMARY OF THE INVENTION

Accordingly, an object of the present invention, which was made in view of the above problems, is to provide a method of suppressing power consumption of an information processing terminal resumed by WOL.

In an information processing terminal of the present invention having a CPU, a memory, and a communication unit for carrying out communication processing to LAN, the CPU includes a WOL monitoring unit for monitoring whether or not a particular packet for indicating resumption of operation from a suspended state is received, a resume processing unit for resuming the operation from the suspended state, a factor recording unit for recording a factor of the resumption to the memory, a cancel monitoring unit for monitoring whether or not a cancel signal to a communication request received after the resumption is received, and a suspend processing unit for switching the operation to the suspended state when the factor of resumption is reception of the particular packet as well as the cancel signal is received after the resumption.

In a power control method according to the present invention, an information processing terminal connected to LAN carries out the steps of monitoring whether or not a particular packet for indicating resumption of operation is received from the LAN when the information processing terminal is in a suspended state, recording a factor of the resumption when the operation is resumed from the suspended state, monitoring whether or not a cancel signal to a communication request received after the resumption is received, and switching the operation to the suspended state when the factor of the resumption is reception of the particular packet as well as the cancel signal is received after the resumption.

According to the present invention, the information processing terminal resumed from the suspended state can be prevented from continuing a normal operating state without being manipulated by a user, thereby it is possible to suppress power consumption of the information processing terminal.

DESCRIPTION OF THE PREFERRED EMBODIMENTS

Figure 1:
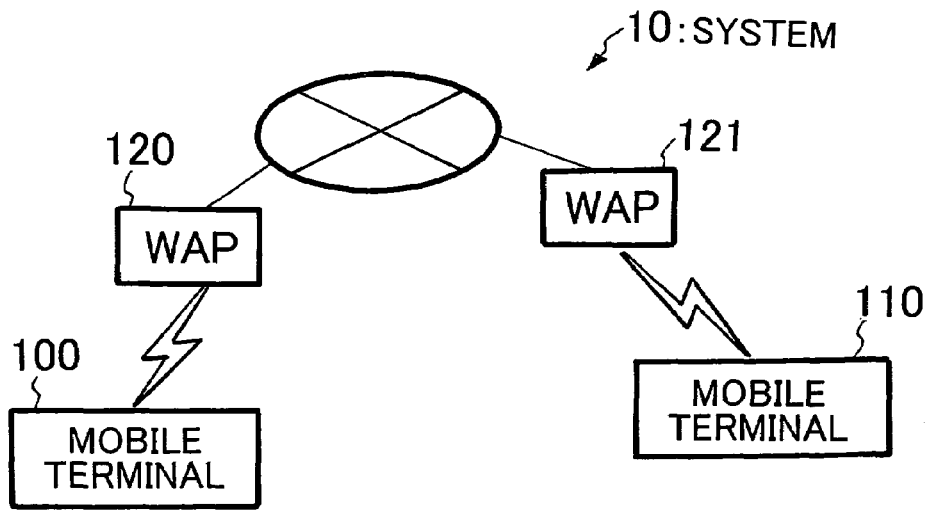
FIG. 1 is a block diagram showing a system arrangement of an embodiment according to the present invention.

FIG. 1 shows an arrangement of a system 10 of an embodiment according to the present invention. The system 10 includes a mobile terminal 100 connected to a WAP 120 as an access point of wireless LAN and a mobile terminal 110 connected to a WAP 121 for carrying out a phone call to the mobile terminal 100. The mobile terminals 100 and 110 have a phone call function based on VoIP (Voice over Internet Protocol).

Figure 2:
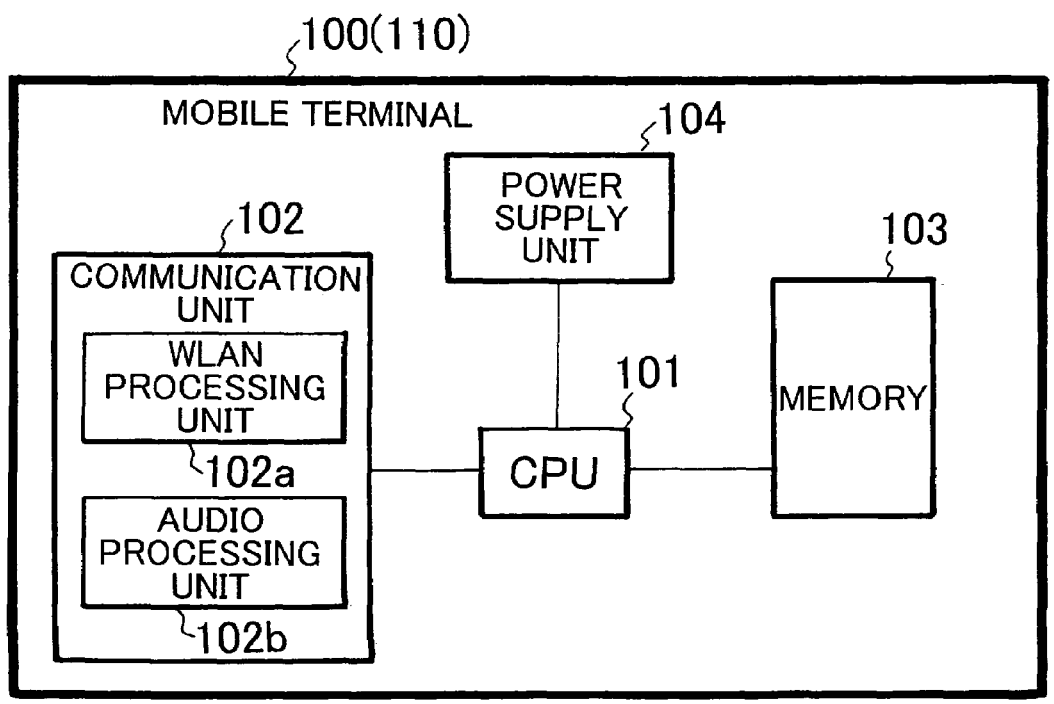
FIG. 2 is a block diagram showing a hardware arrangement of a mobile terminal in the embodiment.

FIG. 2 shows a main hardware arrangement of the mobile terminal 100. The mobile terminal 100 includes a CPU 101, a communication unit 102 in charge of communication processing, a memory 103 as a ROM and RAM, and a power supply unit 104 for supplying power under the control of the CPU 101. The memory 103 is controlled to receive power supply from the power supply unit 104 even in a suspended period.

The communication unit 102 includes a WLAN processing unit 102a as a wireless LAN communication circuit and an audio processing unit 102b having a microphone, a speaker, and the like for phone call. The WLAN processing unit 102a has a function for detecting a magic packet as a particular packet used for WOL and is a component realized by a so-called wireless LAN card for WOL.

Figure 3:
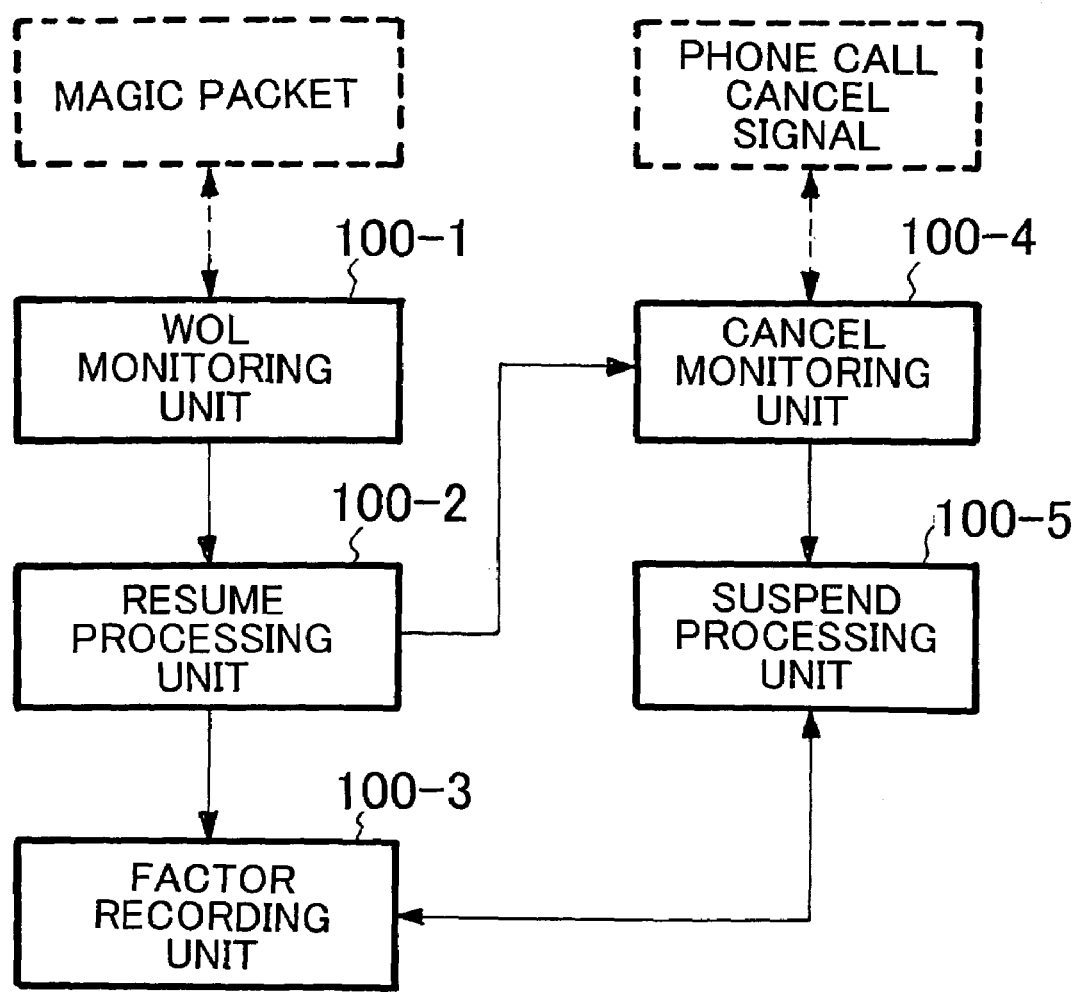
FIG. 3 is a block diagram showing a function arrangement of a mobile terminal in the embodiment.

FIG. 3 shows a functional arrangement of the mobile terminal 100. The arrangement shown in the figure corresponds to an action carried out when the CPU 101 carries out a program stored in the memory 103 or in a not shown memory.

A WOL monitoring unit 100-1 achieves a function for monitoring whether or not the magic packet is received in a suspended state. A resume processing unit 100-2 resumes the operation of the mobile terminal 100 from the suspended state by receiving the magic packet or by other factor. A factor recording unit 100-3 records a factor of resumption to the memory 103. A cancel monitoring unit 100-4 monitors whether or not a cancel signal is received to a call received after resumption from a transmission source. A suspend processing unit 100-5 achieves a function for switching operation to the suspended state under the condition after resumption described later.

Figure 4:
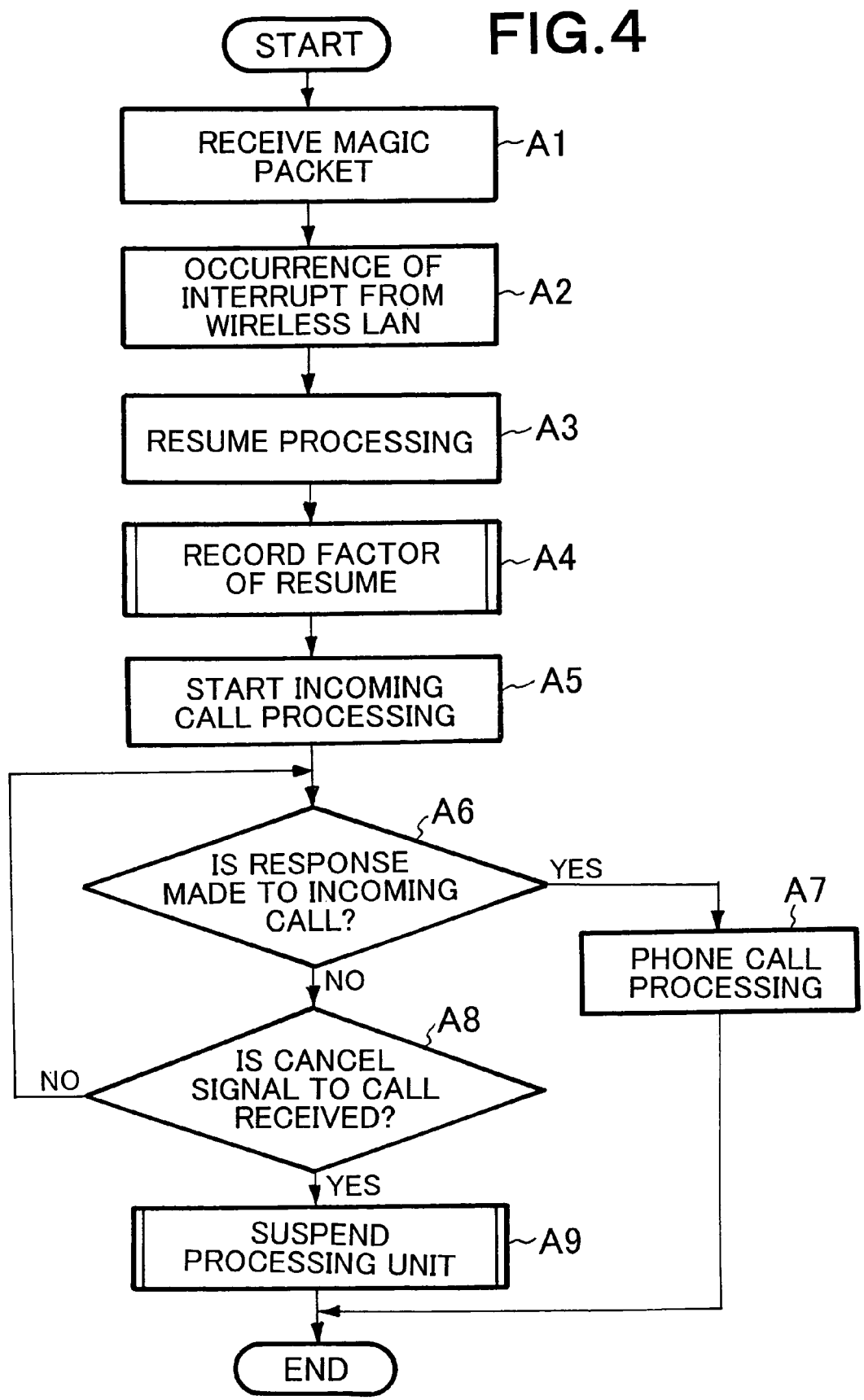
FIG. 4 is a flowchart showing an operation procedure of the embodiment.
Figure 5:
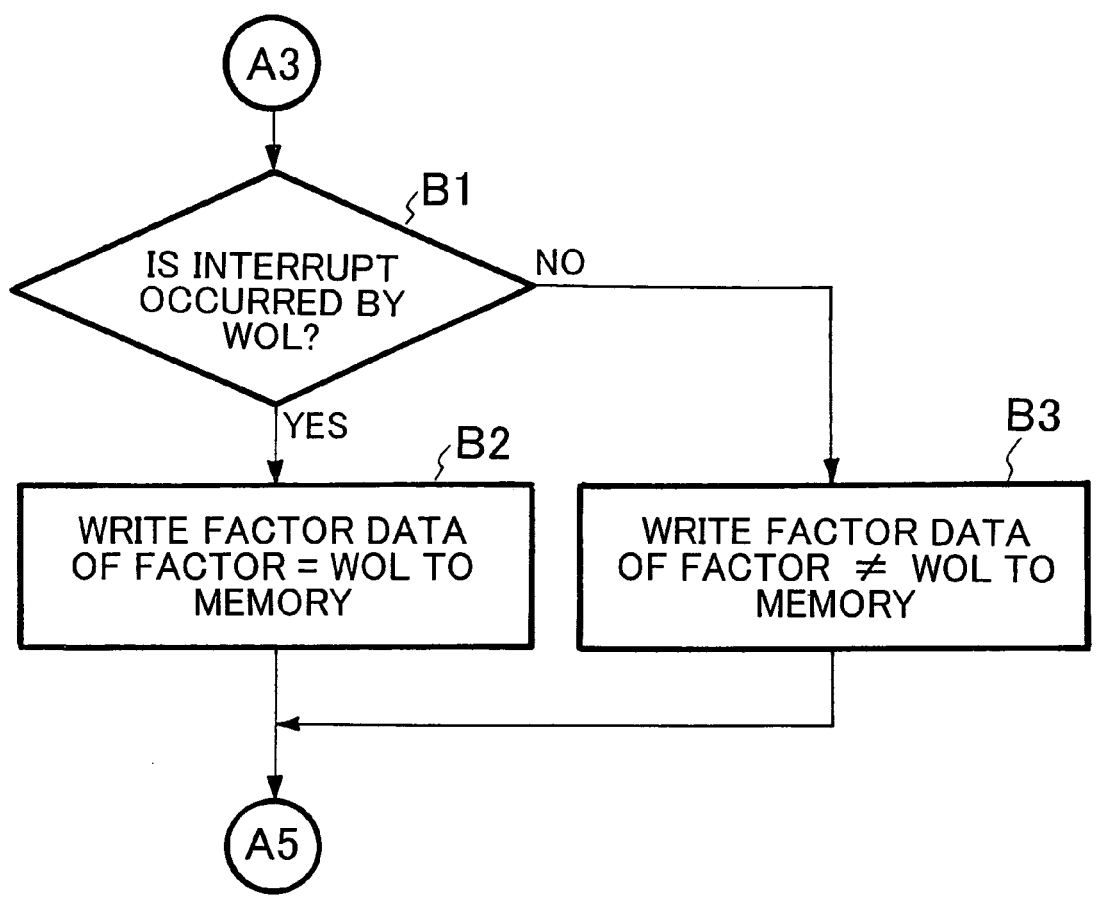
FIG. 5 is a flowchart showing an operation procedure of the embodiment.
Figure 6:
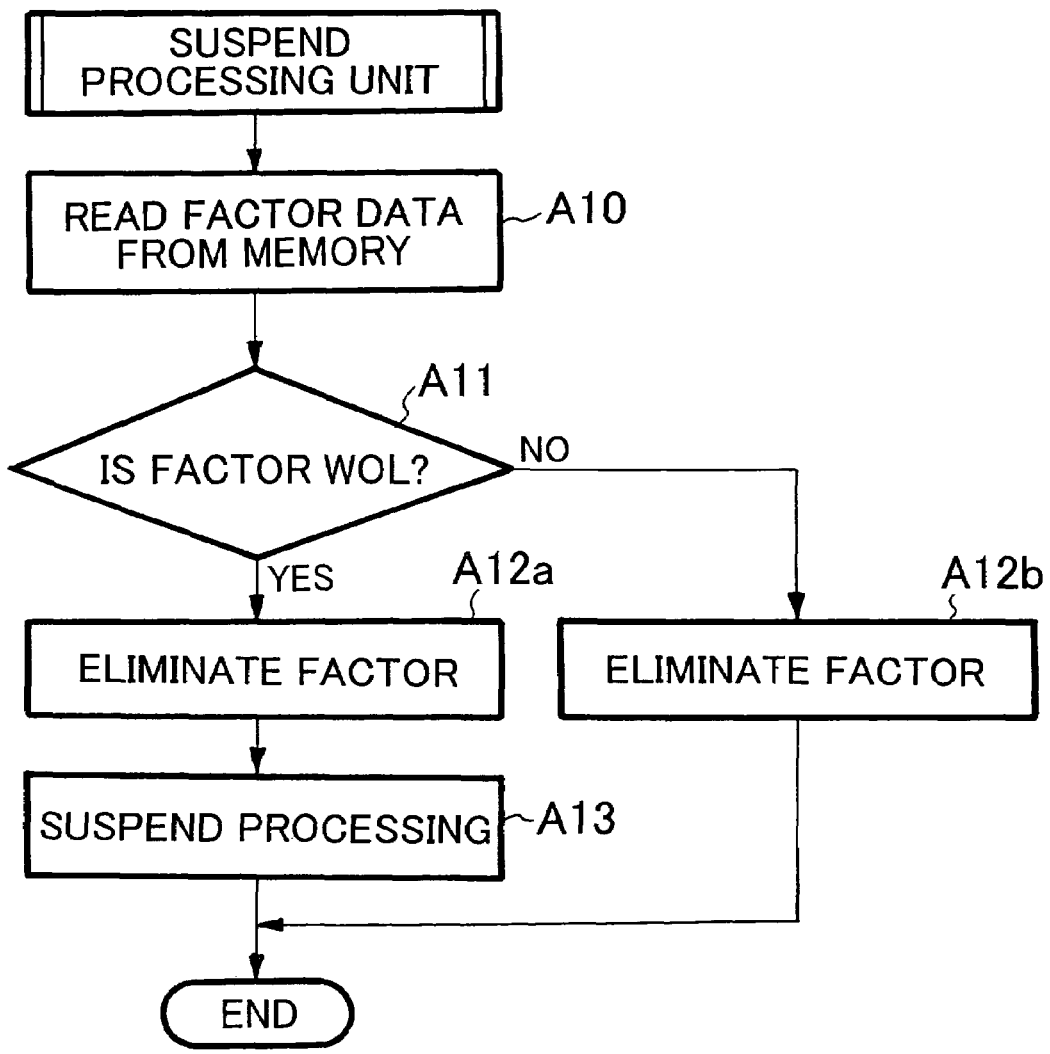
FIG. 6 is a flowchart showing an operation procedure of the embodiment.
Figure 7:
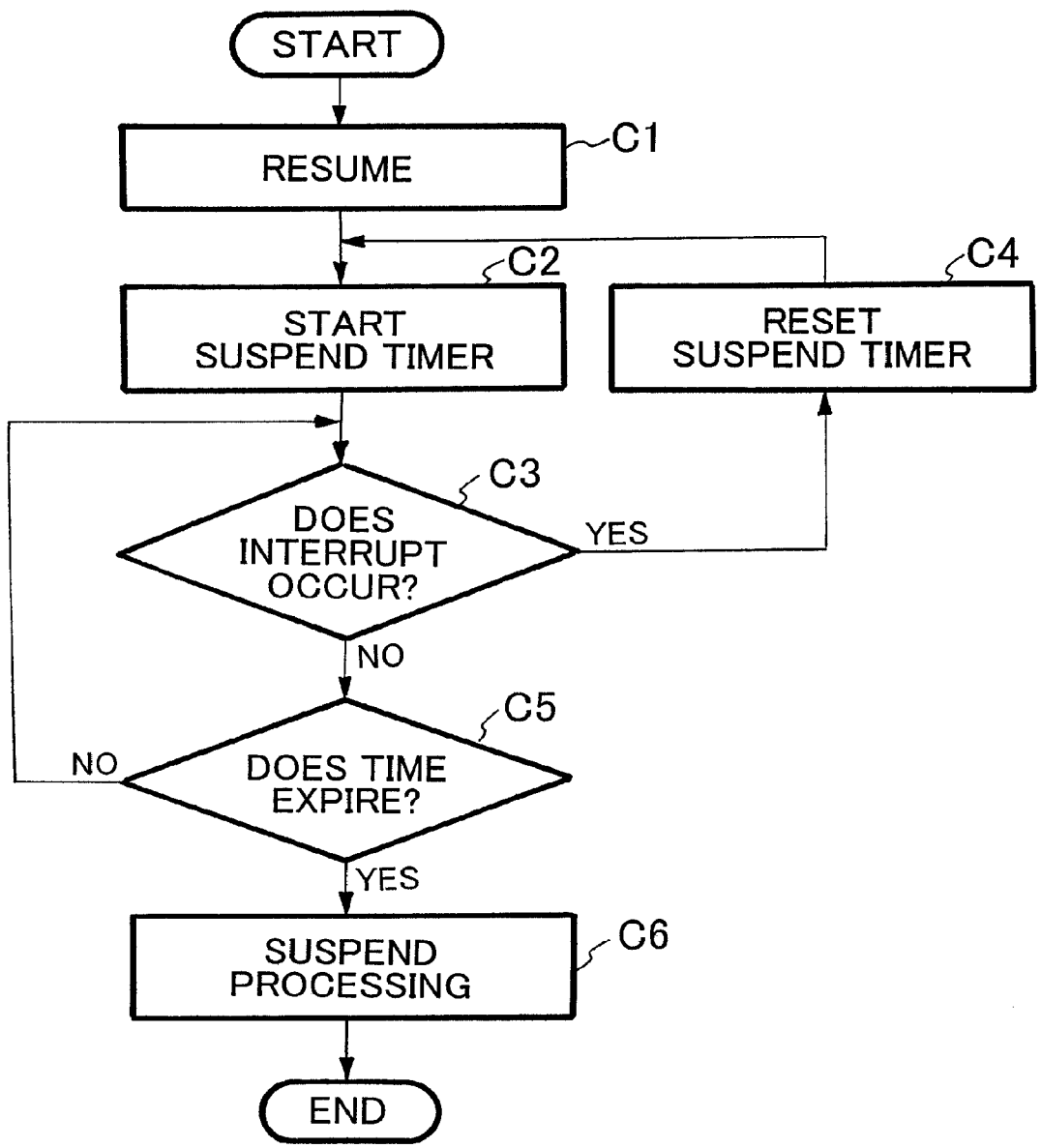
FIG. 7 is a flowchart of timer processing for conventional suspended operation.

An operation procedure of the embodiment will be described with reference to flowcharts shown in FIGS. 4, 5, and 6. A scene, in which the mobile terminal 100 in the suspended state receives a phone call from the mobile terminal 110, is assumed. The mobile terminal 110 on a calling side transmits the magic packet to the mobile terminal 100 to resume it before the mobile terminal 110 calls the mobile terminal 100.

When the mobile terminal 100 receives the magic packet from the mobile terminal 110 (step A1), the WLAN processing unit 102a of the communication unit 102 sets a flag, which shows that interrupt processing occurs in response to a signal input from the wireless LAN, to a register (step A2). When the flag is set, the WOL monitoring unit 100-1 carried out by CPU 101 detects the flag and indicates resumption from the suspended state to the resume processing unit 100-2.

The resume processing unit 100-2 carries out resume processing to the power supply unit 104 (step A3). With this operation, the operation of the mobile terminal 100 in the suspended state is resumed. At the time, the factor recording unit 100-3 examines a factor of resumption according to the procedure described later and records it to the memory 103 (step A4).

Subsequently, when the resumed mobile terminal 100 receives the phone call from the mobile terminal 110 through the wireless LAN, it starts incoming call processing according to a predetermined procedure (step A5). During this period, the mobile terminal 100 monitors whether or not the response manipulation to the incoming call is carried out (step A6), and when the operation is carried out, the mobile terminal 100 carries out phone call processing based on VoIP (step A7).

Further, the mobile terminal 100 monitors whether or not it receives a cancel signal for canceling a call from the mobile terminal 110 through a cancel monitoring unit 100-4 (step A8). When the mobile terminal 100 receives the cancel signal from the mobile terminal 110 without a response manipulation to the incoming call, it shifts to processing carried out by the suspend processing unit 100-5 and described later (step A9).

Here, the processing at the step A4 carried out by the factor recording unit 100-3 will be explained with reference to the flowchart of FIG. 5. When the resume processing unit 100-2 starts (FIG. 4: step A3), the factor recording unit 100-3 determines whether or not the factor of resumption is WOL, that is, whether or not the interrupt processing is a signal input from the wireless LAN (step B1). The determination can be carried out by confirming the flag of the interrupt processing in the register.

As a result, when the factor of resumption is WOL, factor data showing it is written to the memory 103 (step B2). Further, when the factor of resumption is other than WOL, for example, key manipulation carried out by a user, factor data showing that it is other than WOL is written to the memory 103 (step B3). As described above, the factor recording unit 100-3 writes the data showing whether or not the factor of resumption is WOL to the memory 103.

The processing carried out by the suspend processing unit 100-5 will be described with reference to the flowchart of FIG. 6. When the cancel signal is detected by the cancel monitoring unit 100-4, the suspend processing unit 100-5 reads out the factor data written to the memory 103 (step 10A).

The suspend processing unit 100-5 discriminates the contents shown by the factor data (step A11), and when a result discrimination shows WOL, the suspend processing unit 100-5 deletes the factor data (step A12a) and carries out the suspend processing (step A13). That is, after an operating state until just before the suspend processing is carried out is recorded to the memory 103, a signal for shifting to the suspended state is supplied to the power supply unit 104 (step A13). With this operation, the resumed mobile terminal 100 is automatically shifted to the suspended state in response to the cancel signal.

Further, when the read out factor data shows that the factor of resumption is other than WOL, the factor data is deleted (step A12b), and the processing is finished. In this case, the mobile terminal 100 continues operation without shifting to the suspended state.

As described above, when the mobile terminal 100 detects the cancel signal from the mobile terminal 110 after it is resumed by WOL, it automatically shifts to the suspended state. This is such a control that when communication is cancelled from the calling side before the mobile terminal 100 responds to the incoming call, this situation is regarded as that no user exists or no manipulation is carried out at that time, and thus the mobile terminal 100 is immediately shifted to the suspended state.

Therefore, according to the embodiment, the mobile terminal 100, which is not manipulated at that time, is prevented from being left in an ordinary operating state. With this operation, power consumption of the mobile terminal 100 can be suppressed.

In the embodiment, the information processing terminal of the present invention carries out wireless LAN communication. However, when the present invention is embodied, a communication mode of the information processing terminal is not limited to the wireless LAN communication and may be wired LAN communication.

Further, in the embodiment, the present invention is utilized in WOL prior to call, it can be also applied to, for example, facsimile communication based on FoIP (Facsimile Over IP), in addition to the audio communication.

A communication device simultaneously provided with, for example, a phone function is exemplified as a facsimile communication device to which the present invention is preferably applied. When a time expires on a calling side while a phone mode is switched to a facsimile mode in incoming call processing after the communication device is resumed from the suspended state by WOL, a phone call is disconnected before the communication device responds to the calling side.

In this case, according to the present invention, the communication device, which need not carry out response processing regardless that it is resumed once by WOL, can be automatically returned to the suspended state. With this operation, power consumption of the facsimile communication device can be suppressed.

Although the exemplary embodiments of the present invention have been described in detail, it should be understood that various changes, substitutions and alternatives can be made therein without departing from the sprit and scope of the invention as defined by the appended claims. Further, it is the inventor's intent to retrain all equivalents of the claimed invention even if the claims are amended during prosecution.

What is claimed is:

1. An information processing terminal comprising a CPU and a communication unit for carrying out communication processing to LAN, wherein the CPU comprises:
   a WOL (Wake On LAN) monitoring unit for monitoring whether or not a particular packet for indicating resumption of operation from a suspended state is received;
   a resume processing unit for resuming the operation from the suspended state;
   a factor recording unit for recording whether or not a factor of the resumption is the reception of the particular packet to a memory;
   a cancel monitoring unit for monitoring whether or not a cancel signal to a communication request is received after the particular packet is received; and
   a suspend processing unit for switching the operation to the suspended state when the factor of resumption is reception of the particular packet, and the cancel signal is received after the resumption.

2. The information processing terminal of claim 1 wherein:
   the communication unit comprises an audio processing unit for carrying out processing for a phone call; and
   the cancel monitoring unit monitors a signal showing cancel of the phone call as the cancel signal.

3. The information processing terminal of claim 1, wherein the communication unit carries out connection processing to wireless LAN.

4. A power control method, wherein an information processing terminal carries out steps of;
   monitoring whether or not a particular packet for indicating resumption of operation is received when the information processing terminal is in a suspended state;
   recording whether or not a factor of the resumption is the reception of the particular packet when the operation is resumed from the suspended state;
   monitoring whether or not a cancel signal to a communication request is received after the particular packet is received; and
   switching the operation to the suspended state when the factor of the resumption is reception of the particular packet, and the cancel signal is received after the resumption.

5. The power control method of claim 4, wherein the information processing terminal monitors a signal showing cancel of a phone call as the cancel signal at the step of monitoring whether or not the cancel signal is received.

6. The power control method of claim 4, wherein the information processing terminal is connected to a wireless LAN.

7. The power control method of claim 4, wherein the communication request is a Facsimile Over IP (FoIP) request.

8. An information processing terminal comprising a CPU and a communication unit, wherein the CPU comprises:
   means for resuming operation of the information processing terminal from a suspended state when a particular packet is received by the communication unit;
   means for receiving a cancel signal to a communication request;
   means for switching operation of the information processing terminal to the suspended state if both the particular packet and the cancel signal are received by the communication unit.

* * * * *